No. 880,099. PATENTED FEB. 25, 1908.
C. RODRIGUES-ELY & E. GAUTHIER.
HEATING AND WELDING METALS.
APPLICATION FILED APR. 5, 1907.
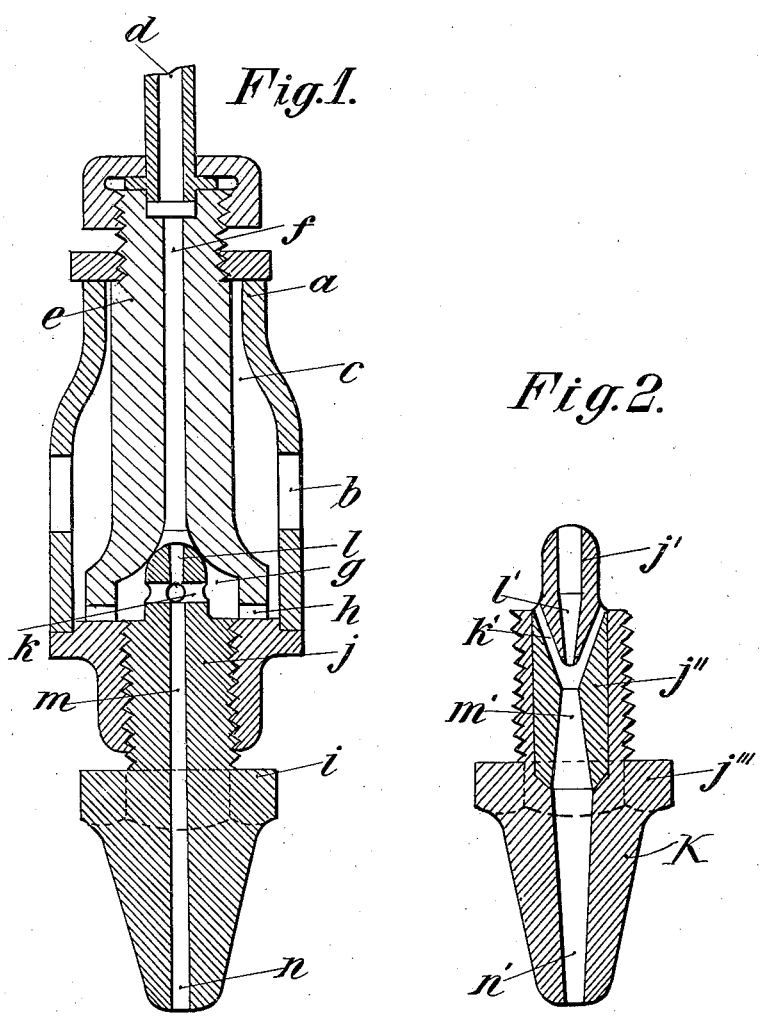
Witnesses:
Georg Otto
Albert Grünfeld
Inventors
Camille Rodrigues-Ely
Emile Gauthier
by William Batally, Attorney

UNITED STATES PATENT OFFICE.

CAMILLE RODRIGUES-ELY AND EMILE GAUTHIER, OF PARIS, FRANCE.

HEATING AND WELDING METALS.

No. 880,099.      Specification of Letters Patent.      Patented Feb. 25, 1908.

Application filed April 5, 1907. Serial No. 366,549.

*To all whom it may concern:*

Be it known that we, CAMILLE RODRIGUES-ELY and EMILE GAUTHIER, citizens of France, residing at Paris, in the Republic of France, have invented certain new and useful Improvements in Heating and Welding Metals, of which the following is a full, clear, and exact description.

The subject of the invention is an apparatus for heating and welding metals by means of a mixture of gases under pressure and the improvement consists in the provision of novel means for mixing the gases, that is forming the gas mixture, consisting of the combustible gas proper and the gas supporting the combustion, before they are brought to operate on the piece to be welded.

The improvement further consists in the provision of novel means for leading the gases under different degrees of pressure and causing the gas under lower pressure to be carried along by the one under high pressure and led by it to the piece to be worked.

The device embodying our invention is characterized by the arrangement of intercommunicating conduits, which bring about the mixing of the heating gas and oxidizing gas in the apparatus before they have left the same.

The device is further characterized in that the outlet mouth-piece is interchangeable and adapted to the particular purpose in view, or after wearing out can be replaced.

A further novel feature of the invention is the particular means for producing a sure seal between the conduits for the compressed gas and the mixture of gas under lower pressure. For this purpose the apparatus is provided with a suitable sealing device, arranged between the mouth-piece and the high pressure gas conduit and adapted for after adjustment by means of a screw.

A further feature of the invention consists in the provision of means for permitting the inlet and outlet channels for the mixture to be altered to suit the purpose in view. This is attained by the plurality of parts in the replaceable part of the mouth-piece, and the conically formed leading channels.

In the accompanying drawings: Figure 1 is a central longitudinal sectional view of the apparatus. Fig. 2 is a central longitudinal sectional view of a mouth-piece having three parts.

The gas under low pressure enters the head $a$ through one or more inlet openings $b$ and fills the circular space $c$, around the center piece $e$. The current of gas under pressure (for example, the current of oxygen) enters through the tube $d$ into the central piece $e$, through which the channel $f$ leads and which is provided with a flaring end having several lateral passages $h$.

In a chamber $g$ of the part $c$ there is a sealing device consisting of a rounded off end piece formed on the inner end of the mouth-piece $j$. The rounded head on the mouth-piece is particularly intended to restrict the communication between the circular space $c$ and the channel $f$ exclusively to the openings $k$, and to prevent any other communication. The head $j$ has several channels $k$, and a further channel $l$ which is prolonged into the channels $m$ and $n$. As the current of gas under pressure passes through the channel $l$, a vacuum arises in the space $g$, which causes the gases under low pressure to be aspirated, that is drawn through the passages $h$. In this way the gases under low pressure are carried along by the gases under high pressure and the mixing of the two gases takes places in the space $m$. The mixture leaves the mouth-piece through the channel $n$.

If a current of gas under pressure is allowed to pass through the tube $d$, it passes through the channel $f$ and the injector passage $l$. On passing out of the same a diminution of pressure is created in the channels $k$, which results in a lessening of the pressure of gas led from the circular space $c$. The two gases are mixed together inside the channel $m$, and after they have been led through the tube $n$ are ignited at the outlet of the same.

Since the head $j$ of Fig. 1 and the head $K$ of Fig. 2 are interchangeable it is possible with one and the same holder, by means of several insert pieces, to alter the size of the passage openings, and to produce in this way weaker and stronger flames and to obtain flame jets of a length and diameter suited to the particular requirements at the time. The replacing of the mouth-piece is produced by screwing the same in and out.

In the form of construction represented in Fig. 2 a mouth-piece with three parts is shown. The first part $j'$ has the longitudinal injector passage $l'$ and the side entrances $k'$ for the gases drawn in. The second part $j''$ which may be integral with the part $j'$ bears the mixing channel $m'$ and the third $j'''$ the outlet channel $n'$. The relation of the cross sections between the injector channel $l'$, suction openings $k'$, mixing and outlet channels $m'$ and $n'$ vary according to the combustible gases used. In using the double or triple part mouth-piece, the pieces $j'$, $j''$, and $j'''$, can of course be proportioned or exchanged according to the particular object in view and the properties of the combustible gases used. This double and triple part construction permits moreover the use of conical (convergent and divergent) leading channels, and allows the apparatus to be easily mounted and dismounted and further permits the parts worn out to be easily replaced. The parts serving to conduct the gases are completely protected from exterior damage and are readily accessible by screwing the mouth-piece $J'''$ loose by means of a screw key, for the purpose of permitting damaged parts, inclosed in the head to be easily replaced.

I claim:

1. Apparatus for heating and welding metals by means of gases, having separate conduits for the two gases under different degrees of pressure, and means for causing the gas under lower pressure to be carried along by the gas under higher pressure, said means comprising a removable outlet nozzle part having a mixing chamber and a rounded head constituting a seal and formed with a longitudinal and lateral passages.

2. An apparatus for heating and welding metals by means of gases having separate conduits for the two kinds of gases under different degrees of pressure, an interposed removable part constituting a nozzle having a mixing chamber and formed at one end with radial channels constituting ports for the passage of gas under low pressure to the mixing chamber, and a longitudinal channel for the passage of gas under high pressure, to the mixing chamber.

3. A removable and detachable mouth-piece for metal heating and welding apparatus employing gases under different pressures comprising an outlet nozzle, a mixing chamber and an injector, said injector being formed with a central and a lateral channel, and with a seal to the high pressure gas conduit.

In witness whereof, we subscribe our signatures in presence of two witnesses.

C. RODRIGUES-ELY.
E. GAUTHIER.

Witnesses:
DEAN B. MASON,
MACHSFENBERG.